(12) United States Patent
Chan

(10) Patent No.: US 8,358,253 B2
(45) Date of Patent: Jan. 22, 2013

(54) VIDEO CONTROL SYSTEM, DISPLAY SYSTEM CONTROL DEVICE AND VIDEO CONTROLLING METHOD

(75) Inventor: Yi Hsin Chan, Taipei (TW)

(73) Assignee: Nexcom International Co., Ltd. (TW)

( * ) Notice: Subject to any disclaimer, the term of this patent is extended or adjusted under 35 U.S.C. 154(b) by 932 days.

(21) Appl. No.: 12/435,627

(22) Filed: May 5, 2009

(65) Prior Publication Data

US 2009/0278985 A1    Nov. 12, 2009

(51) Int. Cl.
*G09G 5/00* (2006.01)
(52) U.S. Cl. .......................................... 345/1.1
(58) Field of Classification Search ............ 345/1.1–3.4; 348/460
See application file for complete search history.

(56) References Cited

U.S. PATENT DOCUMENTS

| | | | |
|---|---|---|---|
| 6,583,771 B1 * | 6/2003 | Furuhashi et al. | 345/1.1 |
| 6,765,543 B1 * | 7/2004 | Masuda et al. | 345/1.1 |
| 2004/0201544 A1 * | 10/2004 | Love et al. | 345/1.1 |
| 2009/0109125 A1 * | 4/2009 | Young et al. | 345/1.3 |
| 2009/0295680 A1 * | 12/2009 | Lida et al. | 345/1.1 |

* cited by examiner

*Primary Examiner* — Dennis Joseph

(57) ABSTRACT

The present invention generally relates to a video control system, more particularly to a video control system, a display system control device and a video controlling method thereof. The video control system comprises a display system control device for processing all signals in the system and a display device assembly, which is composed of at least one and above intellectual display devices having independent addresses each, which are from 1A to M×N. The display system control device comprises a video bridge, which further comprises at least a video bridge unit, a video switch, an embedded microprocessing module and a storage device. The video controlling method comprises the steps of transmitting video inputs to respective video bridge units, which convert the video inputs to the video format of a video switch and outputting the converted video signals to the video switch; enabling the video switch to receive the video signals and output video output stream to the display device assembly. The video bridge and the video switch of the present invention are applied to adjust the ways of providing video sources, enabling the display device assembly to perform more flexibly and efficiently; the present invention further reduces the whole system and maintenance costs.

5 Claims, 15 Drawing Sheets

| Video data (1) | Video data (2) | ... | Video data (N-1) | Video data (N) |
|---|---|---|---|---|
| Video data (N+1) | Video data (N+2) | ... | ... | Video data 2N |
| ... | ... | ... | ... | ... |
| Video data [M×(N-1)+1] | Video data [M×(N-1)+1] | ... | Video data (M×N-1) | Video data (M×N) |

Fig. 5

| 101
Video source:
The full screen of video input 1" | 102
Video source:
The full screen of video input 2" |
|---|---|
| 103
Video source:
The full screen of video input 3" | 104
Video source:
The full screen of video input 4" |

Fig. 11

| 121<br>Video source:<br>Upper left screen of video input 9" | 122<br>Video source:<br>Upper right screen of video input 9" |
|---|---|
| 123<br>Video source:<br>Lower left screen of video input 9" | 124<br>Video source:<br>Lower right screen of video input 9" |

VIDEO CONTROL SYSTEM, DISPLAY SYSTEM CONTROL DEVICE AND VIDEO CONTROLLING METHOD

CROSS-REFERENCE TO RELATED APPLICATION

This application claims foreign priority from a Taiwan Patent Application, Ser. No. 097117308, filed on May 9, 2008.

BACKGROUND OF THE INVENTION

1. Field of the Invention

The present invention generally relates to a video control system, more particularly to a video control system, a display system control device and a video controlling method thereof. The present invention is applied to a display device assembly in a multimedia display circumstance. An embedded controlling video bridge of the display system control device of the video control system and the video switch of the present invention are applied to adjust the ways of providing video sources. In addition, the present invention applies a plurality of display data channels (DDCs) to respectively interlink or a serial communication interface (SCI) to serially connect to the screen display area, enabling a plurality of intelligent display devices to be selected and adjusted, matrix video contents from various sources to be respectively segmented and/or integrated to be presented on respective display devices of the display device assembly. The present invention is further applied to a video wall, which is made up of a plurality of matrix display screens for individual presentation.

2. Description of the Prior Art

An existing display device assembly, such as a video wall, is composed of a plurality of display devices in a matrix assembly. Generally, the prior art has to use a video wall system device to receive all video signals inputted from the display device assembly, transmit those received video contents of all display devices based on the requirements of the assembled display screens, and then, deliver the processed video contents to interrelated display devices in appropriate formats for display screen presentation. Each display screen is an intelligent display device, which is a display element of a display device assembly, so that a video wall is made up of all intelligent display devices.

The above-mentioned display technology of a video wall system generally requires a huge and complicated high end video server, which is so called a 'video wall server'. Such technology applies a centrally control process and needs a higher cost, but its display device is an ordinary display device. In addition, such video wall display technology has no the capability of simultaneously processing a plurality of inputted signal sources, therefore, all video contents after being processed have to be segmented, and then the segmented contents are shown on the corresponding display devices. Consequently, such technology greatly decreases the processing and display efficiencies of a video wall.

In view of the foregoing, such disadvantages in the aspects of product structure, control method and usage of the prior art remain to be improved. Hence, how to establish a new video control system, a new display system control device and a new video controlling method, applying a distributed control processing on video control system and method to the display device assembly, is the most important issue to the persons skilled in the art.

SUMMARY OF THE INVENTION

The primary objective of the present invention is to provide a new video control system, a new display system control device and a video controlling method to solve the problems of prior arts. The present invention is applied to a display device assembly in a multimedia display circumstance. An embedded controlling video bridge of the display system control device of the video control system and the video switch of the present invention are applied to adjust the ways of providing video sources. In addition, the present invention applies a plurality of display data channels (DDCs) to respectively interlink or a serial communication interface (SCI) to serially connect to the screen display area for selecting and adjusting a plurality of intellectual display devices, matrix video contents from various sources to be respectively segmented and/or integrated to be presented on respective display devices of the display device assembly. The present invention is further applied to a video wall, which is made up of a plurality of matrix display screens for individual presentation.

Another objective of the present invention is to provide the new video control system, the new display system control device and the video controlling method in order to improve the disadvantages of prior arts. The present invention is applied to the display device assembly in a multimedia display circumstance. An embedded controlling video bridge of the display system control device of the video control system and the video switch of the present invention are applied to adjust the ways of providing video sources. In addition, the present invention applies a plurality of display data channels (DDCs) to respectively interlink or a serial communication interface (SCI) to serially connect to the screen display area for a user to select and adjust a plurality of intellectual display devices. The present invention is applied to enable the display device assembly to perform more flexibly and efficiently, and further reduces the whole system and maintenance costs.

Another objective of the present invention is to provide the new video control system, the new display system control device and the video controlling method, enabling a plurality of display data channels (DDCs) to respectively interlink or a serial communication interface (SCI) to serially connect to the screen display area for selecting and adjusting a plurality of intellectual display devices. The video control method of the present invention is applied to the display device assembly.

Another objective of the present invention is to provide the new video control system, the new display system control device and the video controlling method in order to improve the disadvantages of prior arts. The present invention applies a plurality of display data channels (DDCs) to respectively interlink or a serial communication interface (SCI) to serially connect to the screen display area for selecting and adjusting a plurality of intellectual display devices. The present invention is applied to enable the display device assembly to perform more flexibly and efficiently, and further reduces the whole system and maintenance costs.

Another objective of the present invention is to provide the new video control system, the new display system control device and the video controlling method in order to improve the disadvantages of prior arts. The present invention is applied to a display device assembly, which is composed of a plurality of intelligent display devices, such as a video wall, for individual presentation. The video controlling method of the present invention enables video contents to be presented on respective intelligent display devices of the display device assembly.

Another objective of the present invention is to provide the new video control system, the new display system control device and the video controlling method in order to improve the disadvantages of prior arts. The present invention is applied to a display device assembly, which is composed of a plurality of intelligent display devices, such as a video wall, enabling video contents to be segmented for processing and presentation.

The video control system of the present invention is applied to a display device assembly in a multimedia display circumstance, comprising a display system control device for controlling the processes of all signals in the video control system, and a display device assembly, which is composed of at least one and above intellectual display devices having independent addresses each, which are from 1A to M×N (The number of the independent address can be extended from 1A to M×N).

The display device assembly and the display system control device of the present invention are connected by a plurality of video signal output streams and a plurality of display data channels (DDCs) or a single serial communication interface (SCI); the number of the plurality of video output streams is equal to the number of the intellectual display devices and the number of the display data channels (DDCs) is equal to the number of the intellectual display devices.

The intellectual display devices of the video controlling system individually interlink each signal from the video output streams of the display system control device and each signal from the display data channels (DDCs), to a maximum of M×N signals from the video output streams.

The plurality of intellectual display devices of the video controlling system not only respective interlink each signal of video output streams from the display system control device, but also jointly connect with the SCI signals of the display system control device in series.

The display system control device of the present invention comprises (1) a video bridge, which further comprises at least one and above video bridge units enabling video inputs to be transformed into a video format suitable for the video format of a video switch and enabling the transformed video signals to be outputted; (2) said video switch, receiving at least a video signal from the video bridge and/or from an embedded micro-processing module, selecting at least one video signal for outputting to the display device assembly to drive at least an intellectual display device of the display device assembly; (3) said embedded micro-processing module, controlling the video switch and display data channels (DDCs) by a MPU control bus, receiving information from a human interface, transmitting video signals to the video switch, dynamically and instantaneously controlling the distribution mechanism of the video switch and dynamically allocating the display data channels (DDCs), so that each display frame of the plurality of intellectual display devices is adjusted in a timely fashion; (4) a plurality of display data channels (DDCs)/a serial communication interface (SCI), wherein the display data channels (DDCs) enable each video signal stream to be individually transmitted with display data from the video switch to each intellectual display device of the display device assembly, or a signal from the serial communication interface (SCI) with a display device address designated to be serially connected to each intellectual display device of the display device assembly.

The aforementioned each video bridge unit of the display system control device of the present invention has the same video bridging functions or has its unique and specific video bridging functions.

The present invention provides a display system control device applied to a display device in a multimedia display circumstance. The display system control device comprises (1) a video bridge, which further comprises at least one and above video bridge units enabling video inputs to be transformed into a video format suitable for the video format of a video switch and enabling the transformed video signals to be outputted; (2) said video switch, receiving at least a video signal from the video bridge and/or from an embedded micro-processing module, selecting at least one video signal for outputting to the display device assembly to drive at least an intellectual display device of the display device assembly; (3) said embedded micro-processing module, controlling the video switch and the display data channels (DDCs) by a MPU control bus, receiving information from a human interface, transmitting video signals to the video switch, dynamically and instantaneously controlling the distribution mechanism of the video switch and dynamically allocating the display data channels (DDCs), so that each display frame of the plurality of intellectual display devices is adjusted in a timely fashion; (4) a plurality of display data channels (DDCs)/a serial communication interface (SCI), wherein the display data channels (DDCs) enable each video signal stream to be individually transmitted with display data from the video switch to each intellectual display device of the display device assembly, or a signal from the serial communication interface (SCI) with a display device address designated to be serially connected to each intellectual display device of the display device assembly; and (5) a storage device, storing various video or multimedia files for the embedded microprocessor module to read and transform the file formats and output the transformed formats to the video switch.

The display data channels (DDCs)/the serial communication interface (SCI) enable the matrix video output streams outputted from the video switch to attach displayed data or SCI signals.

The display device assembly of the display system control device of the present invention is composed of at least one and above intellectual display devices having independent addresses each, which are from 1A to M×N.

The plurality of intellectual display devices form the display device assembly of the display system control device of the present invention, receive inputted video signal streams and the DDC/SCI signals in order to adjust the display frames.

The aforementioned each video bridge unit of the display system control device of the present invention has the same video bridging functions or has its unique and specific video bridging functions.

The present invention provides a video controlling method applied to a display device assembly in a multimedia display circumstance. The video controlling method comprises the following steps that video inputs are transmitted to respective video bridge units of a video bridge, converted to the video format of a video switch and outputted to the video switch from the video bridge unit; and then, the video switch receives the converted video signals and selects the converted video signals for outputting at least a video output stream to the display device assembly.

The aforementioned each video bridge unit of the display system control device of the present invention has the same video bridging functions or has its unique and specific video bridging functions.

The present invention provides a video controlling method applied to a display device assembly in a multimedia display circumstance. The video controlling method comprises the following steps that video inputs are transmitted to a video bridge unit of a video bridge, converted to the video format of a video switch and outputted to the video switch from the video bridge unit; and then, the video switch receives at least one video signal from the video bridge and the embedded micro-processing module for outputting at least a video output stream to the display device assembly.

The aforementioned each video bridge unit of the video controlling method of the present invention has the same video bridging functions or has its unique and specific video bridging functions.

The present invention provides a video controlling method applied to a display device assembly in a multimedia display circumstance. The video controlling method comprises the following steps that video inputs are transmitted to respective video bridge units of the video bridge, the video bridge units convert the video inputs to the video format of a video switch and output the converted video format to the video switch; and then, a plurality of video switch ports receive at least a video signal from the video bridge and the embedded micro-processing module, and the video switch outputs at least a video output stream to the display device assembly; and at last, an embedded micro-processing module dynamically and instantaneously controls the distribution mechanism of the video switch, and dynamically allocating the DDC/SCI signals to each intelligent display device of the display device assembly, in order to adjust each display frame of the plurality of intellectual display devices in a timely fashion.

The display data channels (DDCs)/the serial communication interface (SCI) enable the matrix video output streams outputted from the video switch to attach displayed data or SCI signals.

The aforementioned plurality of video bridge units of the video controlling method of the present invention have the same video bridging functions or have unique and specific video bridging functions.

The present invention provides a video control system comprising a display device assembly, which is composed of a display system control device and a plurality of intelligent display devices. The display system control device comprises an embedded micro-processing module, a video bridge, a video switch, a plurality of display data channels (DDCs)/a serial communication interface (SCI), and a storage device. The connection between the display system control device and the plurality of intelligent display devices is by means of a plurality of video signal output streams and a plurality of display data channels (DDCs) or a single serial communication interface (SCI).

When the video control device proceeds the video controlling method according to the present invention, the plurality of video bridge units of the video bridge of the display system control device transform each video input into a video format that is suitable for the video format of the video switch and output the transformed video signals to the video switch; the video switch with specific input video format comprises a plurality of ports for receiving at least a video output stream from the video bridge and at least a video output stream from the embedded micro-processing module; the video switch outputs M×N matrix of data or at least one video output stream to the display device assembly to drive at least one or M×N intellectual display devices of the display device assembly; the display data channels (DDCs) or the serial communication interface (SCI) enable M×N or at least one DDC/SCI signal to be outputted, the DDCs enable respective video output streams from the video switch to include auxiliary display data channels outputted to each intellectual display device of the display device assembly, or a signal from the serial communication interface (SCI) with a display device address designated to be serially connected to each intellectual display device of the display device assembly; the aforementioned display data or SCI signal has a control commend for adjusting each display frame of each intelligent display device. The embedded micro-processing module controls the whole video controlling processing, such as controlling the video switch, the display data channels (DDCs)/Serial Communication Interface (SCI) and the storage device by a MPU control bus; in addition, receives information from a human interface, adjust various video or multimedia files from the storage device and enable the video output stream with suitable video format of the video switch to be outputted to the video switch. In addition, the embedded micro-processing module dynamically controls the video distribution mechanism of the video switch, dynamically allocates the display data channels (DDCs) or the Serial Communication Interface (SCI), and enables the display data channels (DDCs) or the Serial Communication Interface (SCI) to output a control commend for adjusting each display frame of each intelligent display device of the display device assembly. The embedded micro-processing module instantaneously controls the video sources and video distribution mechanism of the video switch and simultaneously enables the display data channels (DDCs) or the Serial Communication Interface (SCI) to output a control commend for adjusting video contents on each display frame of each intelligent display device of the display device assembly, therefore, a plurality of and/or all video contents on a video wall are able to be presented. Furthermore, the storage device stores various video or multimedia files for the embedded micro-processor module to read and transform the file formats and output the transformed formats to the video switch, consequently, external video sources after being transformed by the video bridge add up to those treated various video or multimedia formats will enrich the video contents on respective intelligent display devices of the display device assembly.

Accordingly, the disclosed video control system and the method thereof applies the video bridge units of the display system control device and the video switch to dynamically distribute various video sources to the screen display areas for a user to select and adjust the display screens of the intellectual display devices, and then applies the display data channels (DDCs) or the serial communication interface (SCI) of the display system control device to adjust each display frame of the plurality of intellectual display devices, consequently, the displayed screens of the display device assembly perform more flexibly and efficiently.

The present invention further comprises a video control system, which is applied to the display device assembly in the multimedia display circumstance. The system comprises a display system control device controlling the processes of all signals of the video control system and a display device assembly, which is composed of at least one and above intellectual display devices with respective independent addresses each, which are from 1A to M×N.

The display system control device comprises a video bridge, a video switch, an embedded micro-processing module, a plurality of display data channels (DDCs)/a serial communication interface (SCI) and a storage device. In addition, the video bridge comprises at least one and above video bridging units for converting video inputs to the video format of the video switch and outputting the converted signals; the video switch receives at least a video signal from the video bridge or/and the embedded micro-processing module, outputs selected video signal and at least one video output stream to the display device assembly to drive at least an intellectual display device of the display device assembly; the embedded micro-processing module controls the video switch and the display data channels (DDCs) by a MPU control bus, receives information from a human interface, transmits video signals to the video switch, dynamically and instantaneously controls the video distribution mechanism of the video switch, and dynamically allocating the display data channels (DDCs), so that each display frame of the plurality of intellectual display devices is adjusted in a timely fashion; the display data channels (DDCs) enable each video output stream to be individually transmitted with display data from the video switch to each intellectual display device of the display device assembly, or a signal from the serial communication interface (SCI) with a display device address designated to be serially connected to each intellectual display device of the display device assembly; the storage device stores various video or multimedia files for the embedded micro-processor module to read and transform the file formats and output the transformed formats to the video switch.

The present invention further provides a video control method, which is applied to the display device assembly in a multimedia display circumstance. The method comprises the following steps that video inputs are transmitted to respective video bridge units of the video bridge, converted to the video format of the video switch and outputted to the video switch from the video bridge unit; and then, a plurality of video switch ports receive at least one and above video signals from the video bridge and the embedded micro-processing module, and then the video switch outputs at least a video output stream to the display device assembly. The embedded micro-processing module dynamically and instantaneously controls the video distribution mechanism of the video switch, and dynamically allocating the DDC/SCI signals to each intelligent display device of the display device assembly, in order to adjust each display frame of the plurality of intellectual display devices in a timely fashion.

In view of the foregoing, the video control system, the display system control device and the video control method of the present invention comprises the following advantages:

1. The present invention is applied to the display device assembly in the multimedia display circumstance and employs the embedded controlling video bridge of the display system control device of the video control system and the video switch to adjust the ways of providing video sources. In addition, the present invention applies a plurality of display data channels (DDCs) to respectively interlink or a serial communication interface (SCI) to serially connect to the screen display area, enabling a plurality of intelligent display devices to be selected and adjusted, matrix video contents from various sources to be respectively segmented and/or integrated to be presented on respective display devices of the display device assembly. The present invention is further applied to a video wall, which is made up of a plurality of matrix display screens for individual presentation.

2. The present invention is applied to the display device assembly in the multimedia display circumstance and employs the embedded controlling video bridge of the display system control device of the video control system and the video switch to adjust the ways of providing video sources. In addition, the present invention applies a plurality of display data channels (DDCs) to respectively interlink or a serial communication interface (SCI) to serially connect to the screen display area, enabling a plurality of intelligent display devices to be selected and adjusted. The video controlling method of the present invention is applied to enable the display device assembly to perform more flexibly and efficiently, and further reduces the whole system and maintenance costs.

3. The plurality of display data channels (DDCs) to respectively interlink or a serial communication interface (SCI) to serially connect to the screen display area, enabling a plurality of intelligent display devices to be selected and adjusted. Through the video controlling method of the present invention, the display device assembly is thus constructed.

4. The present invention applies a plurality of display data channels (DDCs) to respectively interlink or a serial communication interface (SCI) to serially connect to the screen display area, enabling a plurality of intelligent display devices to be selected and adjusted. The video controlling method of the present invention is applied to enable the display device assembly to perform more flexibly and efficiently, and further reduces the whole system and maintenance costs.

5. The present invention is applied to a display device assembly, such as a video wall, which is composed of a plurality of intellectual display devices by employing the video controlling method so to present various video contents on each screen of the intellectual display devices of the display device assembly.

6. The present invention is applied to a display device assembly, such as a video wall, which is made up of a plurality of intellectual display devices, enabling various video contents from various sources to be segmented and displayed on respective display devices of the display device assembly; namely, the present invention has improved the disadvantages of the prior art.

The present invention generally relates to a video control system, a display system control device and a video controlling method thereof. The present invention is applied to the display device assembly in the multimedia display circumstance. An embedded controlling video bridge of the display system control device of the video control system and the video switch of the present invention are applied to adjust the ways of providing video sources. In addition, the present invention applies a plurality of display data channels (DDCs) to respectively interlink or a serial communication interface (SCI) to serially connect to the screen display area for a user to select and adjust a plurality of intellectual display devices, so that matrix video contents from various sources are respectively segmented and/or integrated to be presented on respective display devices of the display device assembly. The present invention is further applied to a video wall, which is made up of a plurality of matrix display screens for individual presentation. The present invention is applied to enable the display device assembly to perform more flexibly and efficiently, and further reduces the whole system and maintenance costs.

To sum up, the present invention greatly differing from the prior art lies in that the present invention does not apply a huge and complicated high end video server (video wall server), instead, the distributed control processing of the present invention applies the more cost-effective embedded controlling video bridge of the display system control device of the video control system and the video switch of the present invention. In addition, the present invention enables a screen display area, which is made up of a plurality of intellectual display devices for a user to select and adjust, to replace ordinary display devices of the prior art. The present invention comprises a display system control device enabling a plurality of display data channels (DDCs) to respectively interlink or a serial communication interface (SCI) to serially connect to the plurality of intellectual display devices of the screen display area, so as to form a new video control system that is required by the display device assembly. Consequently, the present invention achieves the effects on segmenting, integrating and distributing video contents on respective display devices of the display device assembly with significantly cost saving to improve over the disadvantages of the prior art.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 5 illustrates a schematic view of a display device assembly in FIG. 4 and M×N matrix intellectual display devices;

FIG. 11 illustrates a schematic view showing the full screen of a display device assembly in a 2×2 matrix and a plurality of intellectual display devices according to the present invention;

FIG. 15 illustrates a schematic view showing the full screen of another display device assembly in a 2×2 matrix and a plurality of intellectual display devices according to the present invention.

DETAILED DESCRIPTION OF THE INVENTION

Figure 1:
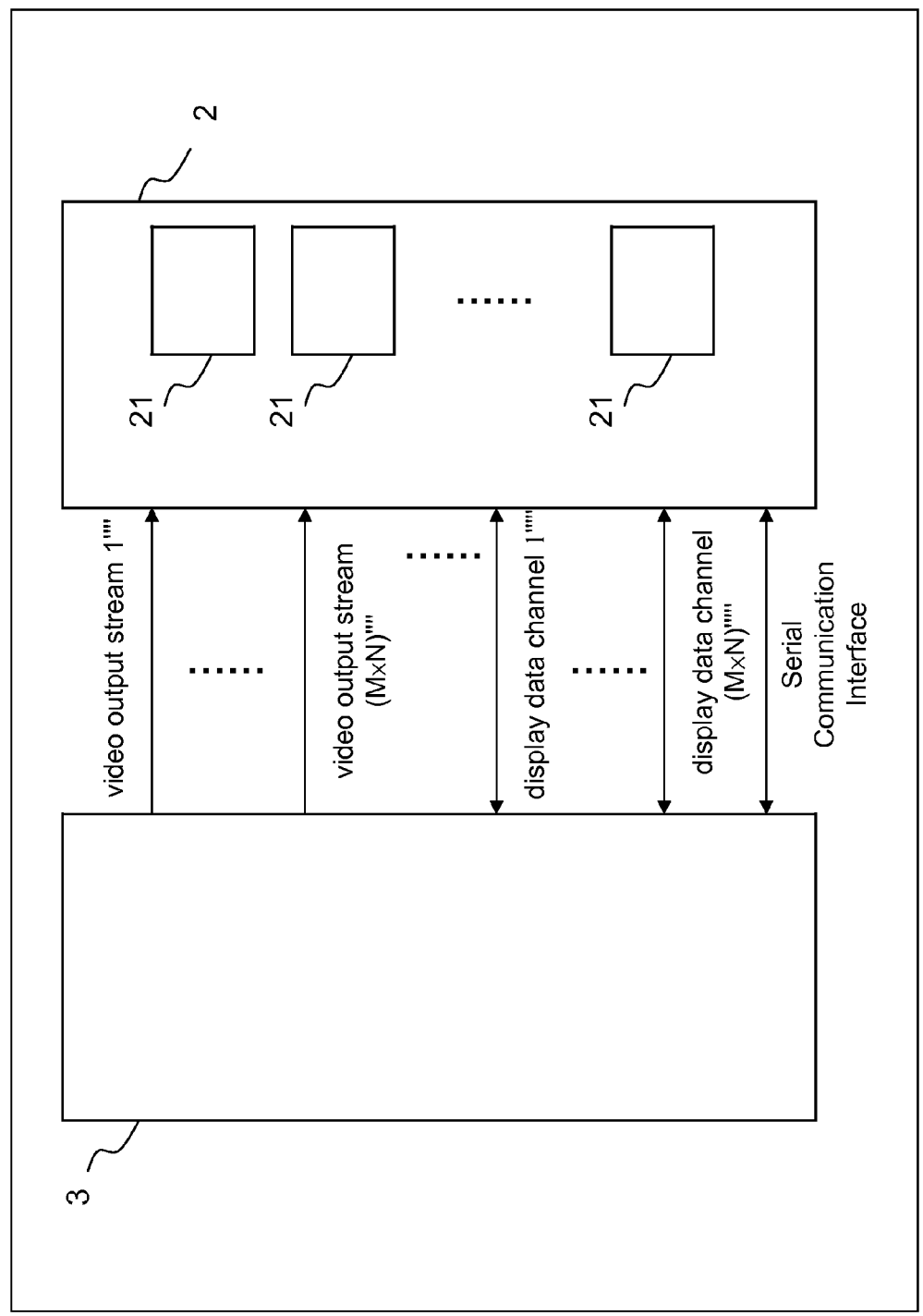
FIG. 1 illustrates a schematic view of a video control system of the present invention.

FIG. 1 is a schematic view of a video control system of the present invention. A video control system 1 of the present invention comprises a display device assembly 2 and a display system control device 3; wherein the display device assembly 2 is composed of at least one and above intellectual display devices 21 with at least independent addresses each, which are from 1 to M×N. The connection between the display device assembly 2 and the display system control device 3 is by means of a plurality of video signal output streams and a plurality of display data channels (DDCs) or a single serial communication interface (SCI); wherein the number of the plurality of video output streams is equal to the number of the intellectual display devices 21 and the number of the display data channels (DDCs) is equal to the number of the intellectual display devices 21.

The plurality of intellectual display devices 21 form the display device assembly 2 of the display system control device 3 of the present invention, receive inputted video signal streams and the DDC/SCI signals in order to adjust the display frames.

Figure 2:
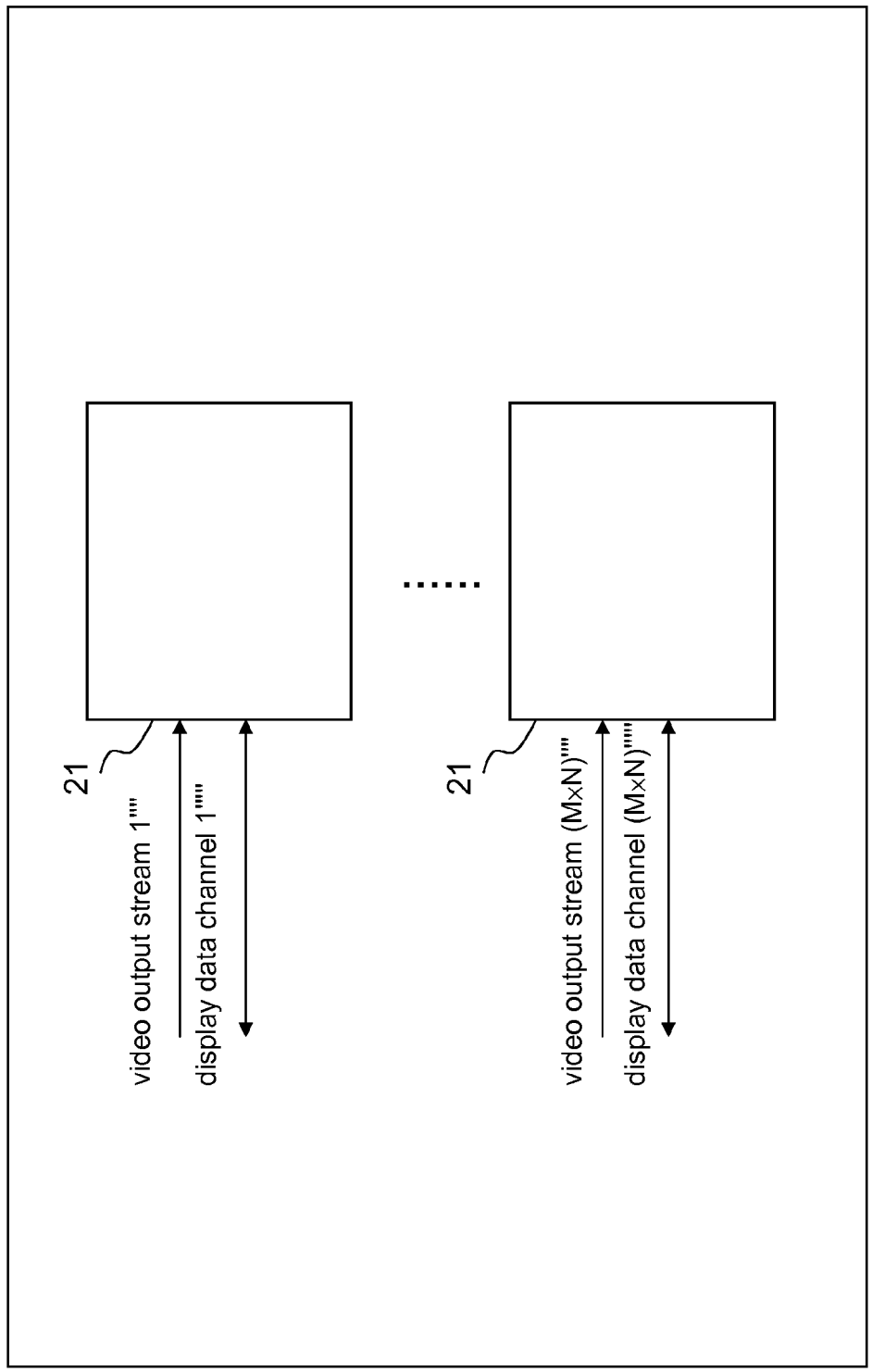
FIG. 2 illustrates a schematic view of a connecting way of a display device assembly of the video control system of the present invention.

FIG. 2 illustrates a schematic view of a connecting way of the display device assembly 2 of the video control system 1 of the present invention. Each of the intellectual display devices 21 is connected to a signal of video output streams from the display system control device 3 and one of the plurality of display data channel signals, which can be extended to the number of M×N.

Figure 3:
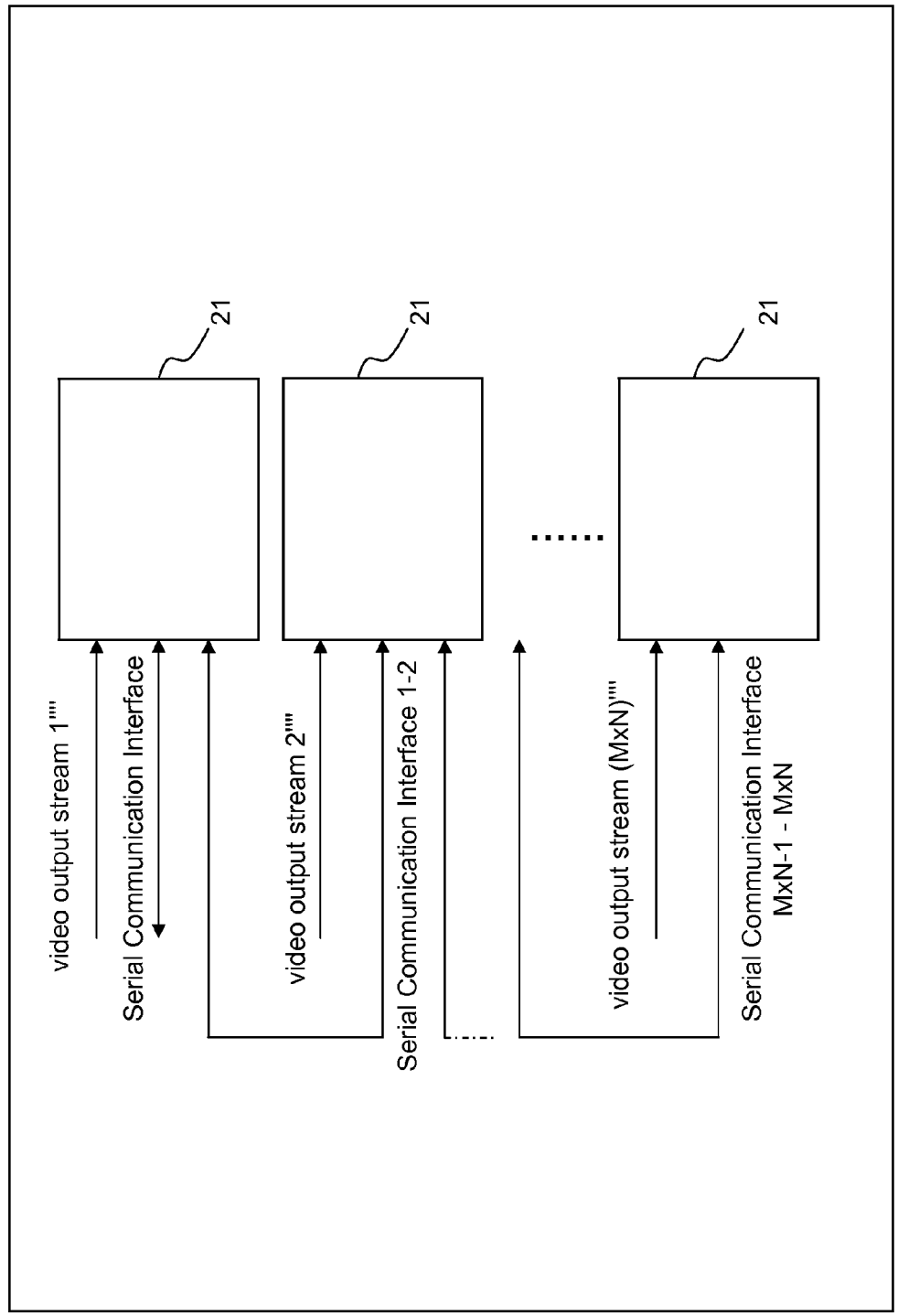
FIG. 3 illustrates a second schematic view of another connecting way of the display device assembly of the video control system of the present invention.

FIG. 3 illustrates a schematic view of another connecting way of the display device assembly 2 of the video control system 1 of the present invention. The plurality of intellectual display devices 21 individually interlink a signal of video output streams from the display system control device 3 and serially connect the serial communication interface (SCI) signals from the display system control device 3. Further, the control commands of the serial communication interface (SCI) signals include the addresses designated to the intellectual display devices 21.

Figure 4:
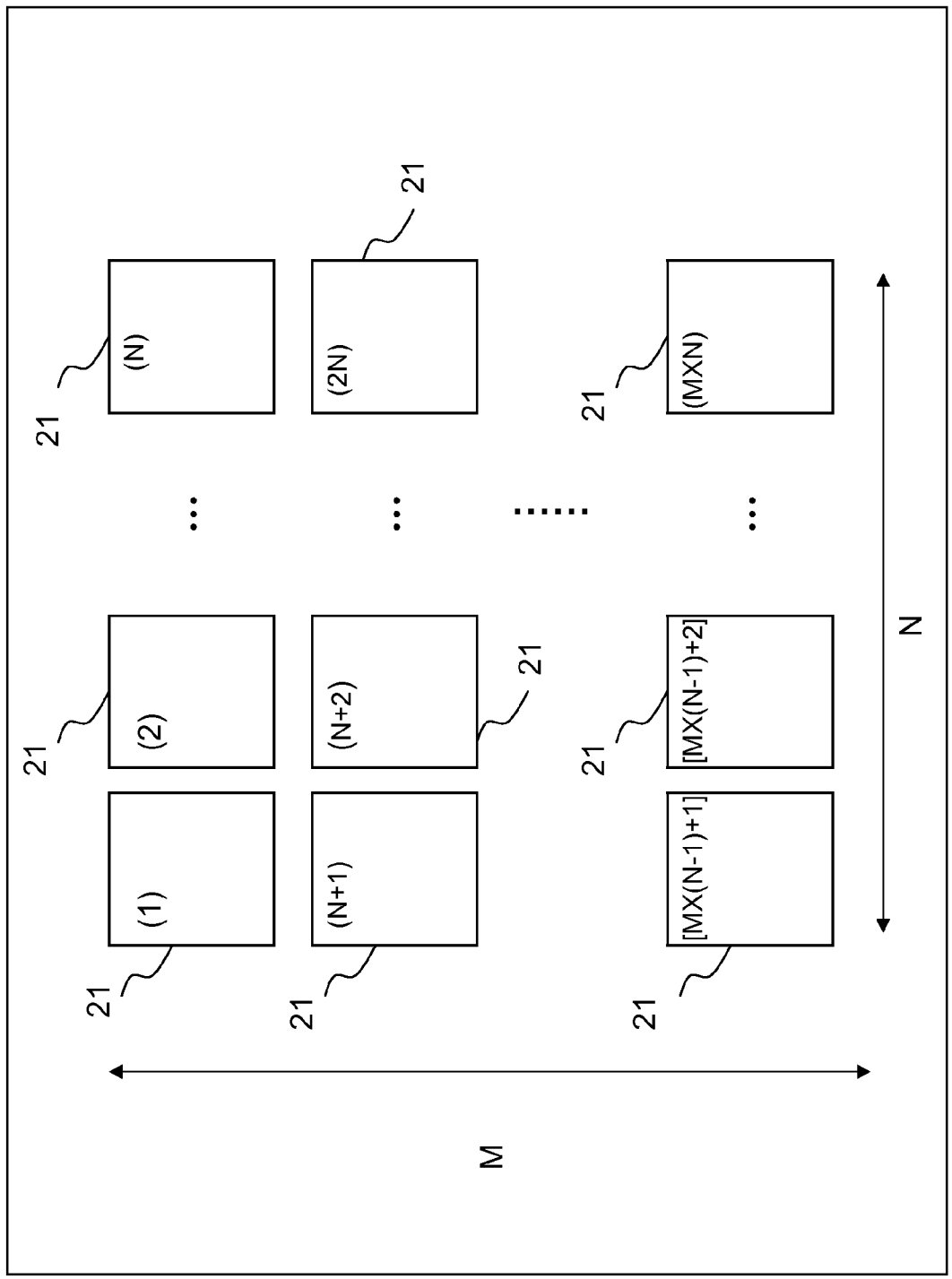
FIG. 4 illustrates a third schematic view of a matrix arrangement of the display device assembly of the video control system of the present invention.

FIG. 4 illustrates another schematic view of a matrix arrangement of the display device assembly 2 of the video control system 1 of the present invention. The display device assembly 2 is made up of M×N matrix display devices, such as a video wall. The video wall is just an example, which is not restricted for the present invention, that is, the arrangement can be arbitrary.

FIG. 5 illustrates a schematic view showing a full display screen 4 of a M×N matrix display device assembly in FIG. 4 and M×N matrix intellectual display devices 41, each of which is corresponding to each display device as shown in FIG. 4. The video system control device 3 of the video control system 1 delivers the M×N matrix video output streams to the display device assembly 2. The display data channels (DDCs)/serial communication interface (SCI) 8 of the video control system 1 respectively deliver video data to DDCs of (1'''' to (M*N)'''') or is serially connected to SCI signals to the intellectual display devices 21 of the display device assembly 2, so as to adjust the display frames of the intellectual display devices 41.

Figure 6:
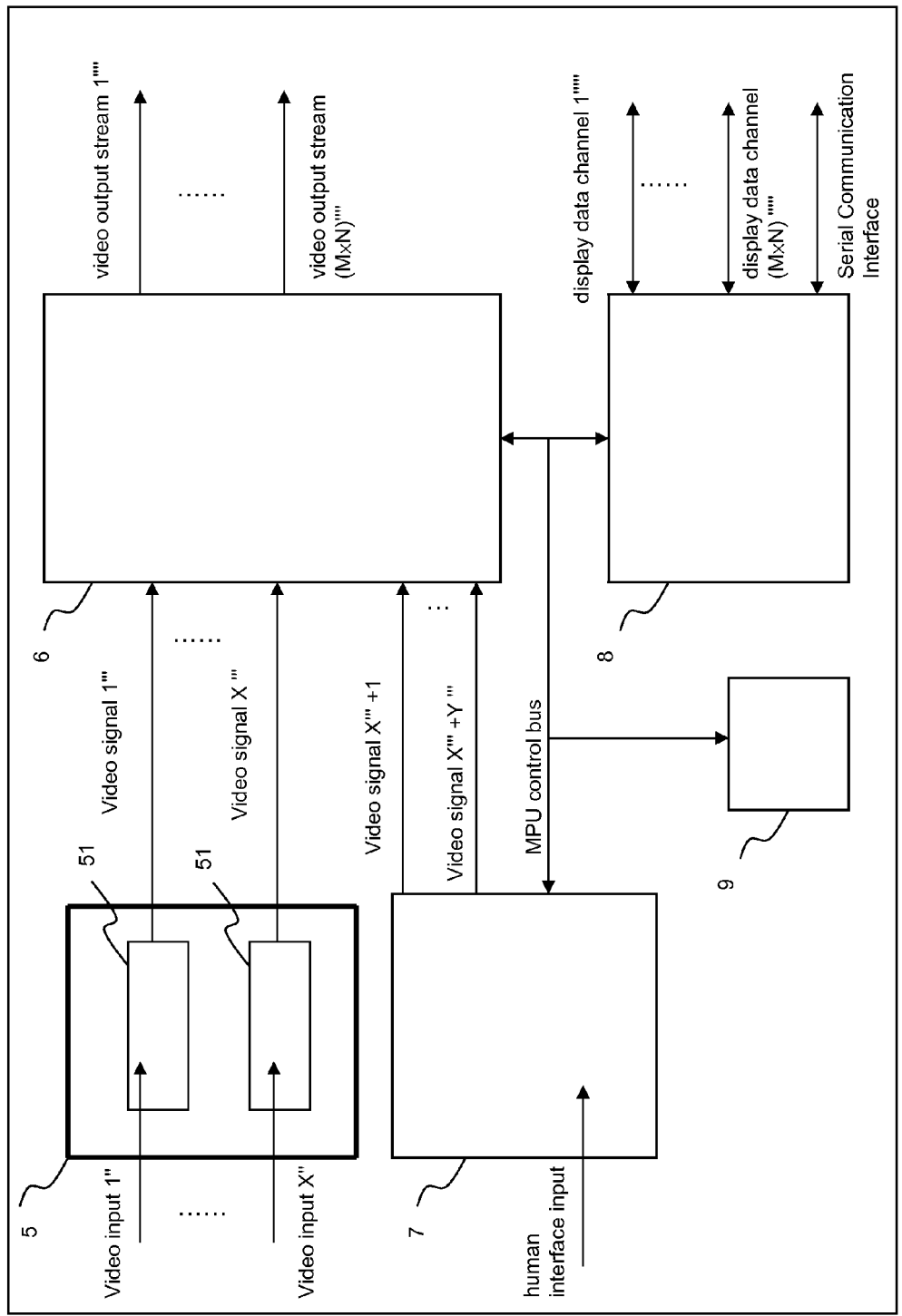
FIG. 6 illustrates a schematic view of a display system control device of the video control system of the present invention.

FIG. 6 is a schematic view of a display system control device 3 of the video control system 1 of the present invention. The display system control device 3 comprises a video bridge 5, a video switch 6, an embedded micro-processing module 7, the display data channels (DDCs)/serial communication interface (SCI) 8, and a storage device 9.

The video bridge 5 comprises at least one and above video bridge units 51.

The video bridge 5 of the display system control device 3 has the video bridging function. The plurality of video bridge units 51 convert video inputs of (1" to x") to the video format of the video switch 6, and output the converted signals to the video switch 6. Each of the plurality of video bridge units 51 has the same video bridging function or its specific video bridging functions itself.

The video switch 6 comprises a specific video input format and a plurality of video switch ports to receive at least one video output stream, for example, video output streams of (1"" to x""), from the video bridge 5 and to receive at least one and above video output streams, such as video signals of (X'''+1 to X'''+Y'''), from the embedded micro-processing module 7. The video switch 6 outputs M×N matrix signals or at least one and above video output streams (1"" to (M×N)"") to the display device assembly 2, which is a video wall as shown in a preferred embodiment in FIG. 4, so that the plurality of intellectual display devices of (1 to M×N) in FIG. 5 are then driven by the video output streams of (1"" to (M×N)"").

The embedded micro-processing module 7 controls the whole video controlling procedures, in addition, controls the video switch 6, the display data channels (DDCs)/serial communication interface (SCI) 8 and the storage device 9 by a micro-processor control bus (MPU control bus). Moreover, the embedded micro-processing module 7 receives information from a human interface, adjusts the audio and video signals of (X'''+1 to X'''+Y''') or multimedia files from the storage device 9 and generates video output streams to fit the video format of the video switch 6 and continuously transmits those signals to the video switch 6. Furthermore, the embedded micro-processing module 7 dynamically and instantaneously controls the distribution mechanism of the video switch 6, so that each of the video output streams of (1"" to (M×N)"") from the video switch 6 is able to dynamically select one of the video signals of (1 to X'''+Y'''). The embedded micro-processing module 7 dynamically controls the display data channels (DDCs)/Serial Communication Interface (SCI) 8 to output a control commend for adjusting each display frame of the plurality of intellectual display devices 21 of the display device assembly 2 in a timely fashion; namely, the present invention dynamically adjusts those display frames of the plurality of intelligent display devices 21 through the display data channels (DDCs)/Serial Communication Interface (SCI) 8. Seeing that the embedded micro-processing module 7 of the present invention is able to dynamically and instantaneously control the distribution mechanism of the video switch 6 and dynamically controls the display data channels (DDCs)/Serial Communication Interface (SCI) 8 to output a control commend for adjusting each display frame of the plurality of intelligent display devices 21 of the display device assembly 2 in a timely fashion, therefore, a plurality of and/or all video contents are able to be displayed on the display device assembly, for example, a video wall.

The plurality of display data channels (DDCs)/serial communication interface (SCI) 8 are able to output a M×N matrix or at least one DDCs/SCI signal. The display data channels (DDCs) are able to allow the M×N matrix video output streams of (1"" to (M×N)"") from the video switch 6 with the auxiliary display data channels to be outputted to each of the plurality of intellectual display devices; the serial communication interface (SCI) serially transmits each SCI signal with a designated address to each of the intellectual display devices. The aforementioned each DDC/SCI signal includes the control commands of adjusting each display frame of the plurality of intellectual display devices.

The storage device 9 stores various video or multimedia files for the embedded micro-processor module 7 to select, read and transform the file formats and output the transformed formats of the video signals of (X"+1 to X"+Y") to the video switch 6. Furthermore, the storage device 9 cooperates with the video bridge 5 to transform video signals of (1''' to X''') inputted from external video sources. Consequently, external video sources after being transformed add up to those treated various video or multimedia formats will enrich the video contents on respective intelligent display devices of the display device assembly.

The aforementioned display device assembly 2 is made up of one and above intelligent display devices, which respectively posses independent addresses of (1 to M×N) each. Therefore, the plurality of intelligent display devices form the display device assembly 2, receive not only video signals but also DDC/SCI signals, which are control commends for adjusting each display frame of the intelligent display devices.

Figure 7:
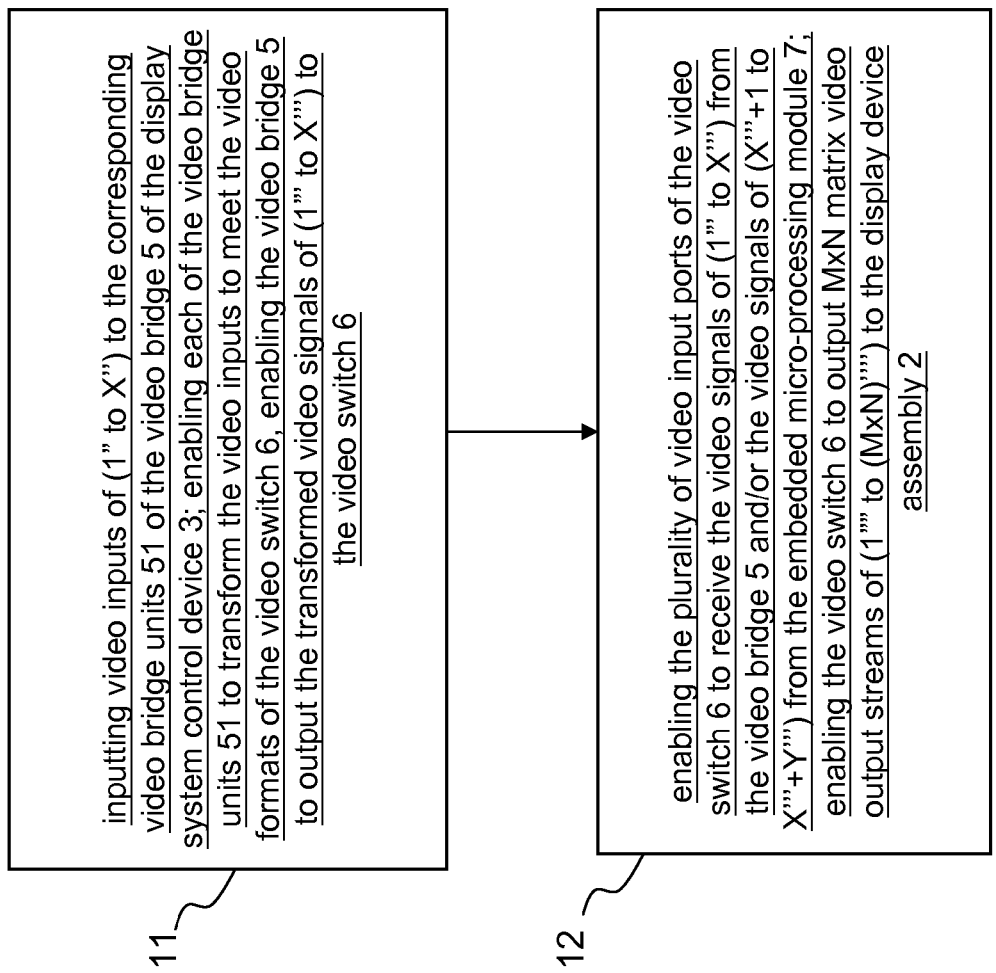
FIG. 7 illustrates a flow chart showing the steps of a video controlling method for controlling the display system control device of the present invention.

FIG. 7 illustrates a flow chart showing the steps of a video controlling method for controlling the display system control device of the present invention. The method includes the steps of (S11) inputting video inputs of (1" to X") to the corresponding video bridge units 51 of the video bridge 5 of the display system control device 3, enabling each of the video bridge units 51 to transform the video inputs to meet the video formats of the video switch 6, enabling the video bridge 5 to output the transformed video signals of (1''' to X''') to the video switch 6. The plurality of video bridge units 51 of the display system control device 3 have the same video bridging functions as functions or their own specific video bridging functions. The method then goes to step (S12).

The step (S12) of the present invention includes enabling the plurality of video input ports of the video switch 6 to receive the video signals of (1''' to X''') from the video bridge 5 and/or the video signals of (X'''+1 to X'''+Y''') from the embedded micro-processing module 7, enabling the video switch 6 to output M×N matrix video output streams of (1"" to (M×N)"") to the display device assembly 2, which is a video wall as an example in the embodiment, to drive the M×N intellectual display devices of the display device assembly 2; besides, enabling the display data channels (DDCs)/ serial communication interface (SCI) 8 to control the M×N matrix video output streams of (1"" to (M×N)"") to be outputted from the video switch 6 with auxiliary display data channels of (1"" to M×N"") to each of the plurality of intellectual display devices 21 of the display device assembly 2, or enabling a SCI signal to be serially connected to each of the plurality of intellectual display devices 21 of the display device assembly 2.

The video controlling method of the present invention enables the embedded micro-processing module 7 to control the whole video control processing, so that the video switch 6, the display data channels (DDCs)/Serial Communication Interface (SCI) 8 and the storage device are controlled by a MPU control bus. Moreover, the embedded micro-processing module 7 receives information from a human interface, transforms the audio and video signals of (X'''+1 to X'''+Y''') or multimedia files from the storage device 9 and generates video output streams of (1"" to (M*N)"") to fit the video format of the video switch 6 and continuously transmits those signals to the video switch 6. Furthermore, the embedded micro-processing module 7 dynamically controls the distribution mechanism of the video switch 6, so that each of the video output streams of (1'''' to (M×N)'''') from the video switch 6 is able to dynamically select one of the video signals of (1'''' to X'''+Y'''). The embedded micro-processing module 7 dynamically controls the display data channels (DDCs)/ Serial Communication Interface (SCI) 8 to output a control commend for adjusting each display frame of the plurality of intelligent display devices 21 of the display device assembly 2 in a timely fashion; namely, the present invention dynamically adjusts those display frames of the plurality of intelligent display devices 21 through the display data channels (DDCs)/Serial Communication Interface (SCI) 8. Seeing that the embedded micro-processing module 7 of the present invention is able to dynamically and instantaneously control the distribution mechanism of the video switch 6 and dynamically controls the display data channels (DDCs)/Serial Communication Interface (SCI) 8 to output a control commend for adjusting each display frame of the plurality of intelligent display devices 21 of the display device assembly 2 in a timely fashion, therefore, a plurality of and/or all video contents are able to be displayed on the display device assembly, for example, a video wall.

Figure 8:
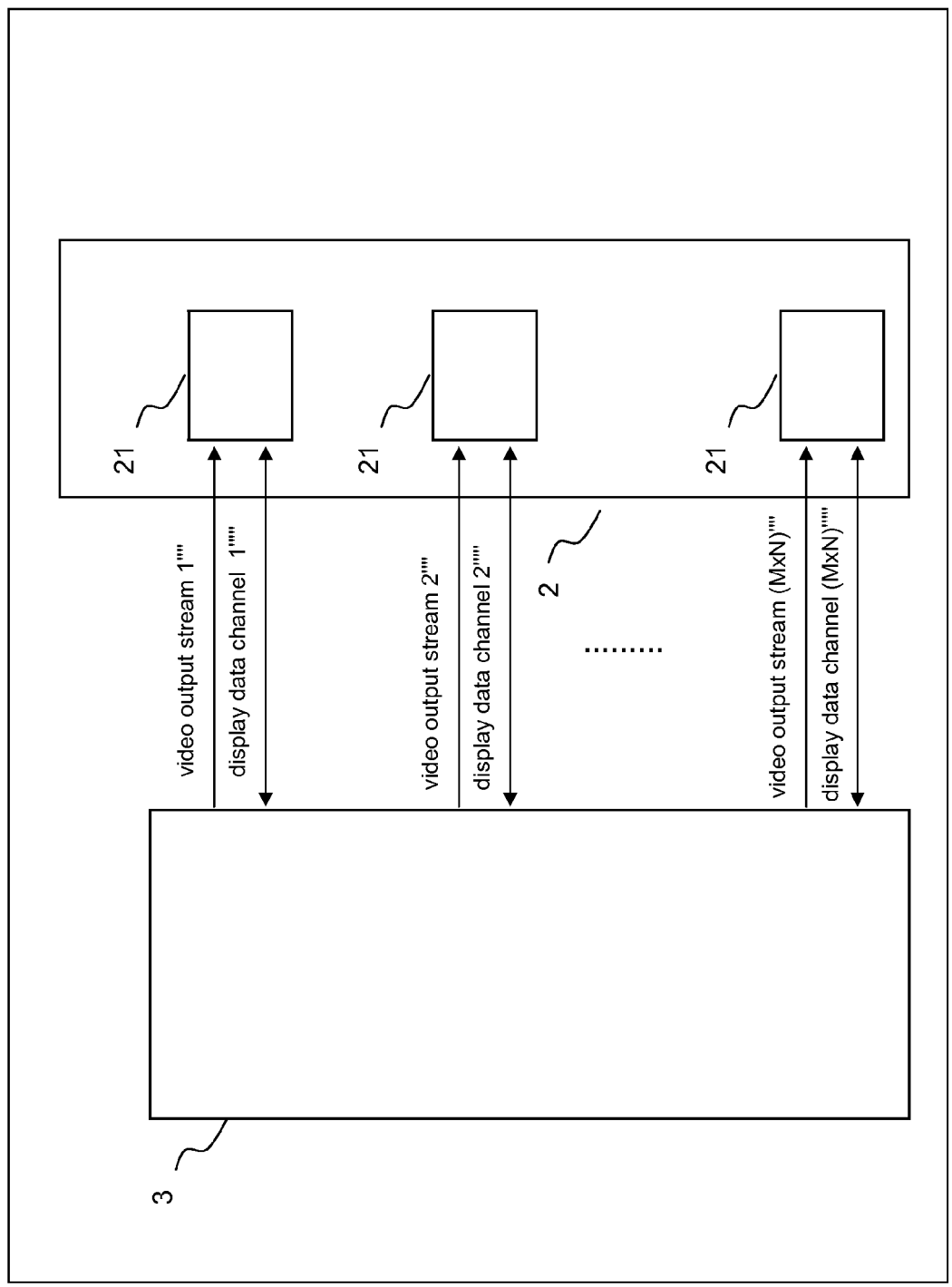
FIG. 8 illustrates a schematic view showing the operation between a display device assembly and the video control system of the present invention.

FIG. 8 illustrates a schematic view showing the operation between a display device assembly and the video control system of the present invention. The display system control device 3 delivers the M×N matrix of video output streams (1'''' to (M*N)'''') to each of the plurality of intelligent display devices 21 of the display device assembly 2, in addition, the auxiliary display data channels of (1'''''' to (M×N)'''''') are delivered to each of the plurality of intelligent display devices 21 of the display device assembly 2 by the display data channels (DDCs)/serial communication interface (SCI) 8 of the display system control device 3.

Figure 9:
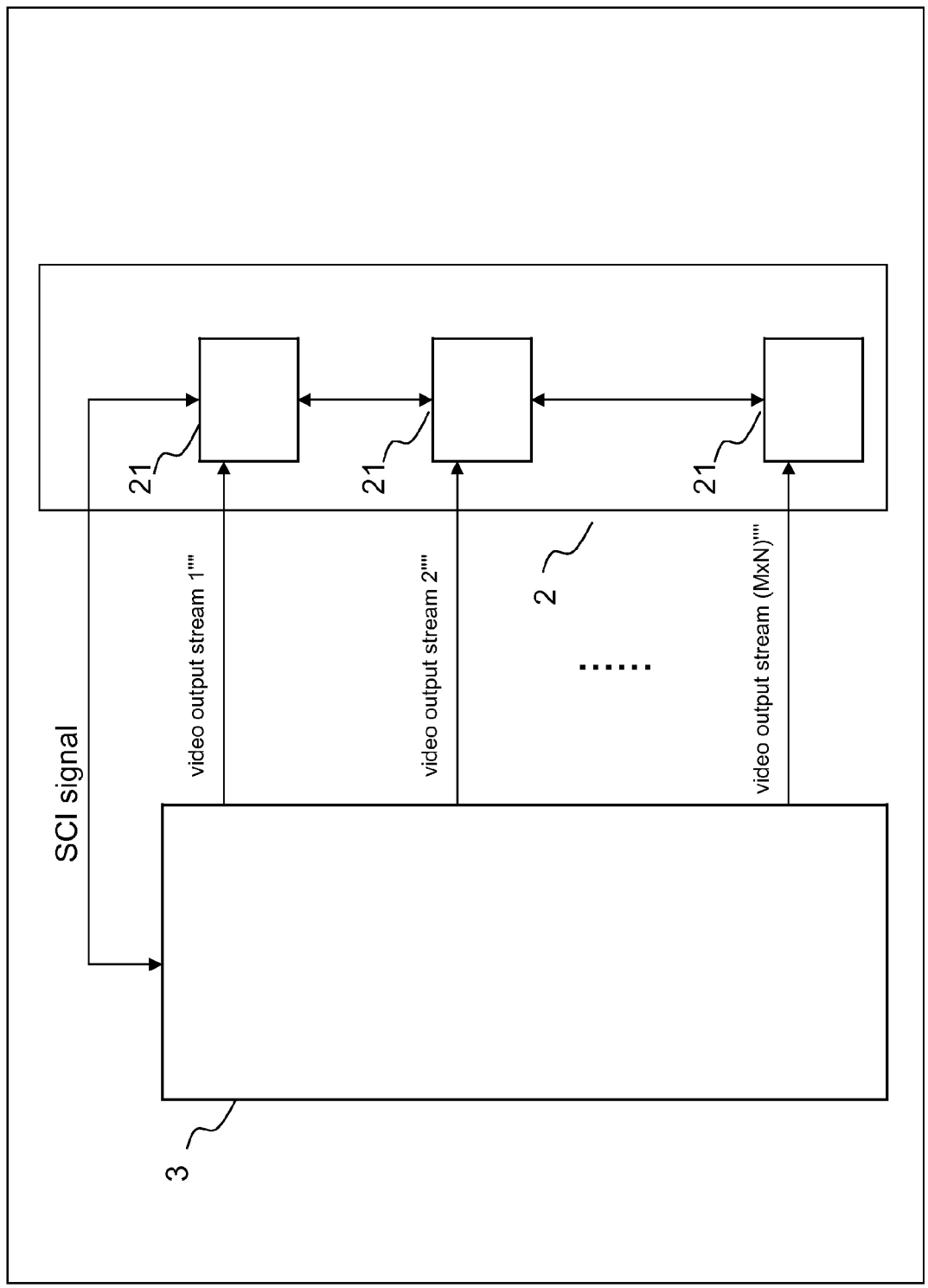
FIG. 9 illustrates another schematic view showing the operation between a display device assembly and the video control system of the present invention.

FIG. 9 illustrates another schematic view showing the operation between a display device assembly and the video control system of the present invention. The display system control device 3 enables the M×N matrix of video output streams (1'''' to (M×N)'''') to be transmitted to each of the intelligent display devices 21 of the display device assembly 2, in addition, each of the auxiliary SCI signals are delivered to each of the plurality of intelligent display devices 21 of the display device assembly 2 by the display data channels (DDCs)/serial communication interface (SCI) 8 of the display system control device 3.

Figure 10:
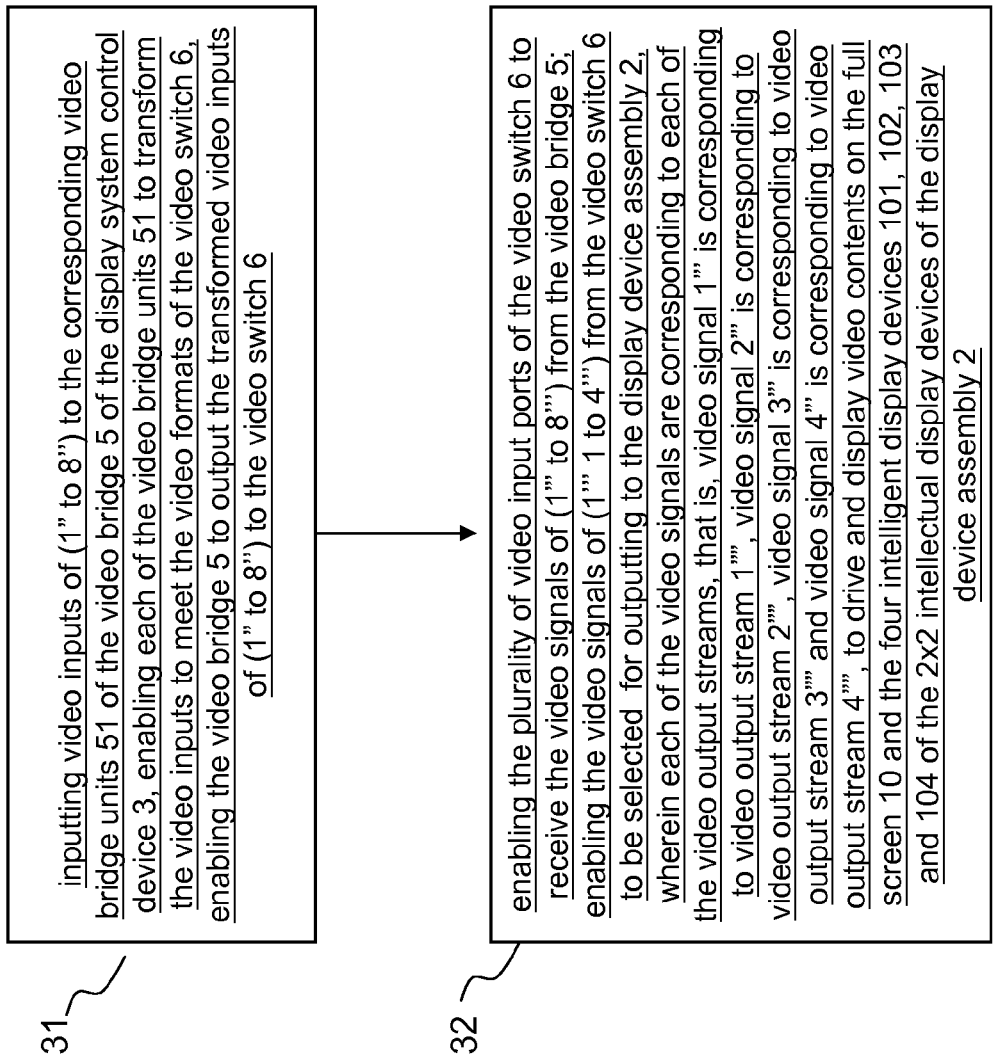
FIG. 10 illustrates a flow chart of a first preferred embodiment showing the video controlling method for controlling the video system of the present invention.

With reference to FIG. 10, a flow chart of a first preferred embodiment shows the video controlling method for controlling the video system of the present invention and FIG. 11 is a schematic view showing the full screen of a display device assembly in a 2×2 matrix and a plurality of intellectual display devices according to the present invention. As shown in FIG. 11, the video control system 1 of the present invention is a 2×2 matrix display device assembly with four intellectual display devices 101, 102, 103, and 104 and a full screen 10. The method of the first preferred embodiment includes the steps of (S31) inputting video inputs of (1" to 8") to the corresponding video bridge units 51 of the video bridge 5 of the display system control device 3, enabling each of the video bridge units 51 to transform the video inputs to meet the video formats of the video switch 6, enabling the video bridge 5 to output the transformed video inputs of (1" to 8") to the video switch 6. The plurality of video bridge units 51 of the display system control device 3 have the same video bridging functions as functions or their own specific video bridging functions. The method then goes to step (S32).

The step (S32) of the present invention includes enabling the plurality of video input ports of the video switch 6 to receive the video signals of (1''' to 8''') from the video bridge 5; enabling the video signals of (1'''1 to 4''') from the video switch 6 to be selected for outputting to the display device assembly 2, wherein each of the video signals are corresponding to each of the video output streams, that is, video signal 1''' is corresponding to video output stream 1'''', video signal 2''' is corresponding to video output stream 2'''', video signal 3''' is corresponding to video output stream 3'''' and video signal 4''' is corresponding to video output stream 4'''', to drive and display video contents on the full screen 10 and the four intelligent display devices 101, 102, 103 and 104 of the 2×2 intellectual display devices of the display device assembly 2, wherein the video output streams of (1'''' to 4'''') are respectively and dynamically corresponding to any video signals of (1''' to 8'''); besides, enabling the display data channels (DDCs)/serial communication interface (SCI) 8 to control the video output streams of (1'''' to 4'''') to be outputted from the video switch 6 with auxiliary display data channels of (1''''' to 4''''') to each of the plurality of intellectual display devices 21 of the display device assembly 2, or enabling a SCI signal to be serially connected to each of the plurality of intellectual display devices 21 of the display device assembly 2. In the preferred embodiment, the display data channels of (1'''' to 4'''') or the SCI signal include a control command for corresponding the full screen to respective display devices.

The video controlling method of the present invention enables the embedded micro-processing module 7 to control the whole video control processing, and the video switch 6, the display data channels (DDCs)/Serial Communication Interface (SCI) 8 and the storage device 9 are controlled by a MPU control bus. Moreover, the embedded micro-processing module 7 receives information from a human interface and dynamically controls the video sources and the distribution mechanism from the video switch 6. In the preferred embodiment, the video output streams of (1'''' to 4'''') are selected from the video signals of (1''' to 4''') of the video switch 6 and transmitted to the display device assembly 2 with the full display screen 10 and the four intelligent display devices 101, 102, 103 and 104. The embedded micro-processing module 7 dynamically controls the display data channels (DDCs)/Serial Communication Interface (SCI) 8 to output a control commend for adjusting each display frame of the plurality of intelligent display devices 21 of the display device assembly 2 in a timely fashion. In the preferred embodiment, the four intelligent display devices 101, 102, 103 and 104 of the full display screen 10 are all full screens for video inputs. Seeing that the embedded micro-processing module 7 of the present invention is able to dynamically and instantaneously control the video sources and the distribution mechanism of the video switch 6, and at the same time, dynamically controls the display data channels (DDCs)/Serial Communication Interface (SCI) 8 to output a control commend for adjusting each display frame of the plurality of intelligent display devices 21 of the display device assembly 2 in a timely fashion, therefore, a plurality of and/or all video contents are able to be displayed on the display device assembly, for example, a video wall.

Figure 12:
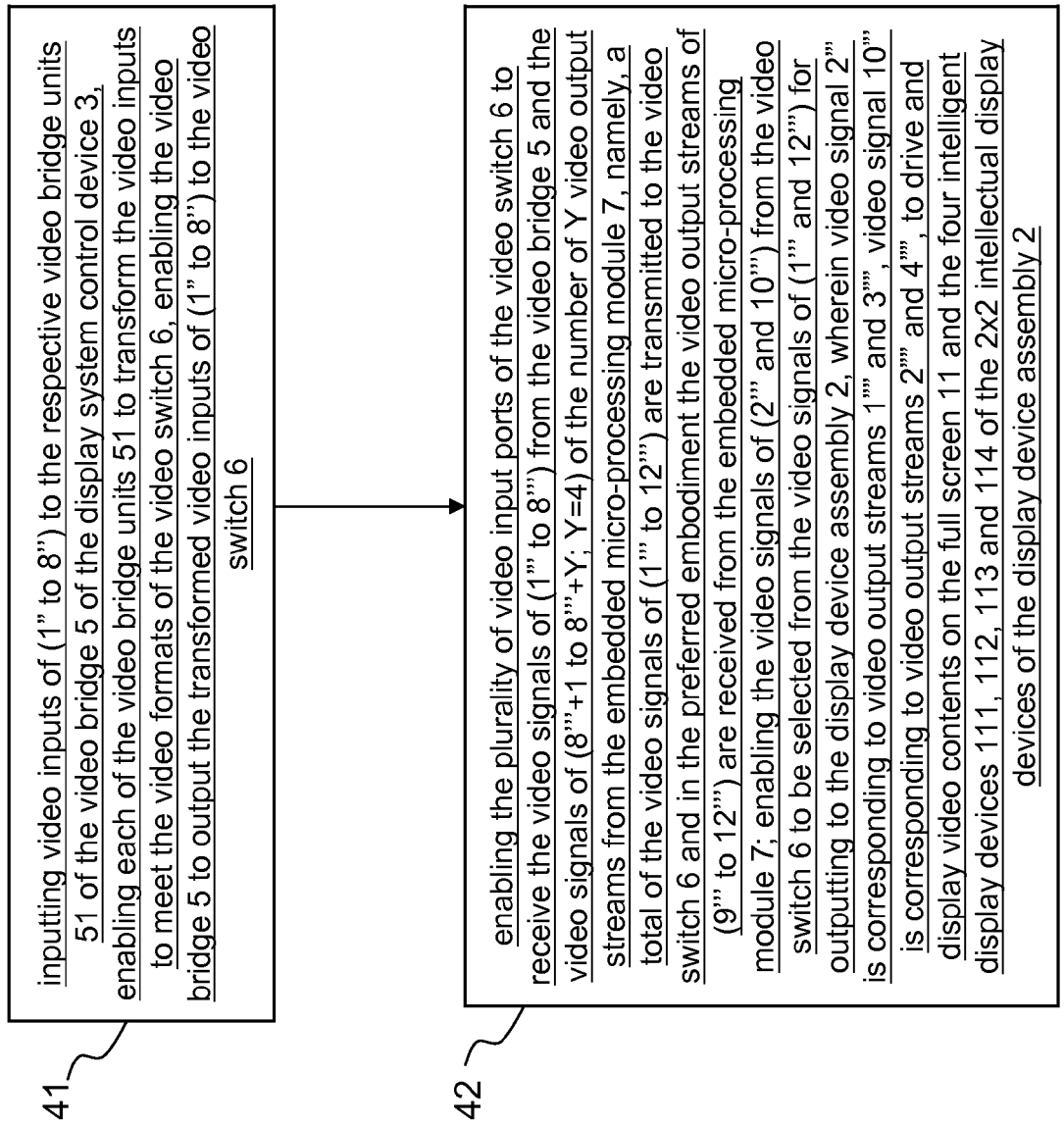
FIG. 12 illustrates a flow chart of a second preferred embodiment showing the video controlling method for controlling the video system of the present invention.
Figure 13:
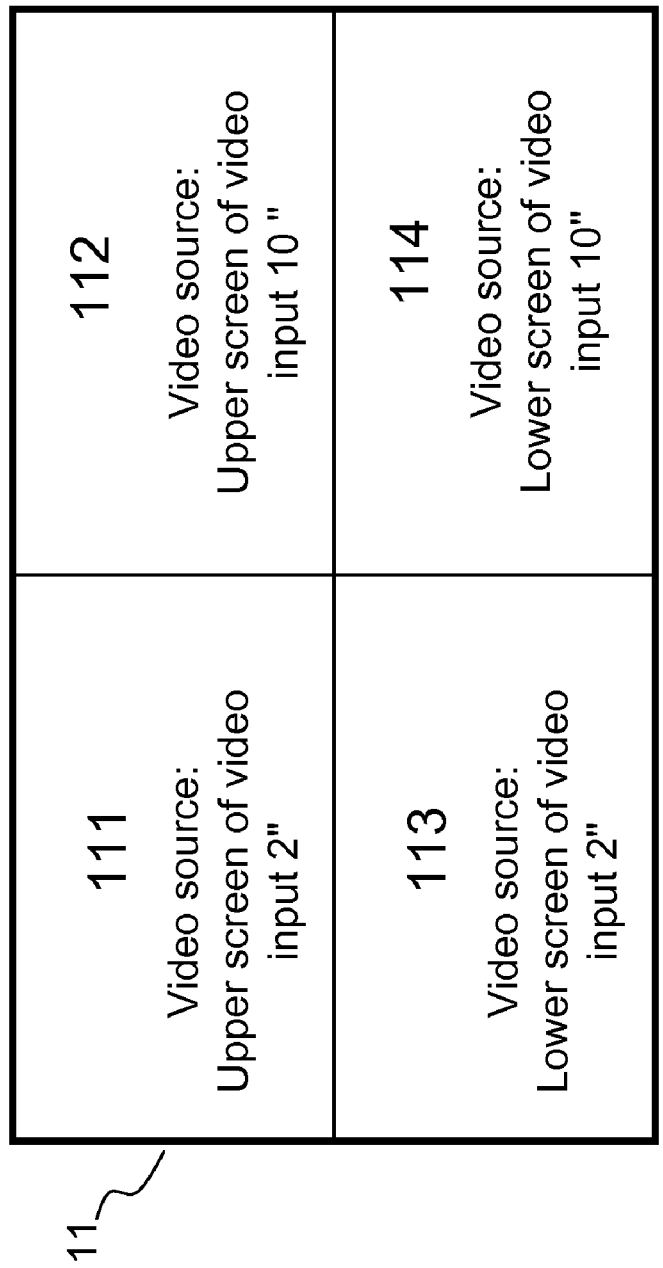
FIG. 13 illustrates a schematic view showing the full screen of another display device assembly in a 2×2 matrix and a plurality of intellectual display devices according to the present invention.

FIG. 12 illustrates a flow chart of a second preferred embodiment showing the video controlling method for controlling the video system of the present invention. FIG. 13 illustrates a schematic view showing the full screen of another display device assembly in a 2×2 matrix and a plurality of intellectual display devices according to the present invention. As shown in FIG. 13, the video control system 1 of the present invention is a 2×2 matrix display device assembly with four intellectual display devices 111, 112, 113, and 114 and a full screen 11. The method of another preferred embodiment includes the steps of (S41) inputting video inputs of (1"

to 8″) to the respective video bridge units 51 of the video bridge 5 of the display system control device 3, enabling each of the video bridge units 51 to transform the video inputs to meet the video formats of the video switch 6, enabling the video bridge 5 to output the transformed video inputs of (1″ to 8″) to the video switch 6. The plurality of video bridge units 51 of the display system control device 3 have the same video bridging functions as functions or their own specific video bridging functions. The method then goes to step (S42).

The step (S42) of the present invention includes enabling the plurality of video input ports of the video switch 6 to receive the video signals of (1‴ to 8‴) from the video bridge 5 and the video signals of (8‴+1 to 8‴+Y; Y=4) of the number of Y video output streams from the embedded micro-processing module 7, namely, a total of the video signals of (1‴ to 12‴) are transmitted to the video switch 6 and in the preferred embodiment the video output streams of (9‴ to 12‴) are received from the embedded micro-processing module 7; enabling the video signals of (2‴ and 10‴) from the video switch 6 to be selected from the video signals of (1‴ and 12‴) for outputting to the display device assembly 2, wherein video signal 2‴ is corresponding to video output streams 1⁗ and 3⁗, video signal 10‴ is corresponding to video output streams 2⁗ and 4⁗, to drive and display video contents on the full screen 11 and the four intelligent display devices 111, 112, 113 and 114 of the 2×2 intellectual display devices of the display device assembly 2, wherein the video output streams of (1⁗ to 4⁗) are respectively and dynamically corresponding to any video signals of (1‴ to 8‴); besides, enabling the display data channels (DDCs)/serial communication interface (SCI) 8 to control the four matrix video output streams of (1⁗ to 4⁗) to be outputted from the video switch 6 with auxiliary display data channels of (1′⁗ to 4′⁗) to each of the plurality of intellectual display devices 21 of the display device assembly 2, or enabling a SCI signal to be serially connected to each of the plurality of intellectual display devices 21 of the display device assembly 2. In the preferred embodiment, the display data channels of (1′⁗ and 2′⁗) give the command for controlling the upper display screens of the intellectual display devices 111 and 112; the display data channels of (3′⁗ and 4′⁗) give the command for controlling the lower display screens of the intellectual display devices 113 and 114; or the Serial Communication Interface transmits a control command of the display screens of the related intellectual display devices respectively through designated addresses.

The video controlling method of the present invention enables the embedded micro-processing module 7 to control the whole video control processing, and the video switch 6, the display data channels (DDCs)/Serial Communication Interface (SCI) 8 and the storage device 9 are controlled by a MPU control bus. Moreover, the embedded micro-processing module 7 receives information from a human interface and dynamically controls the video sources and the distribution mechanism from the video switch 6. In the preferred embodiment, the video output streams of (1⁗ to 4⁗) are selected from the video signals of (2″ and 10″) of the video switch 6 and transmitted to the display device assembly 2 with the full display screen 10 and the four intelligent display devices 111, 112, 113 and 114. The embedded micro-processing module 7 dynamically controls the display data channels (DDCs)/Serial Communication Interface (SCI) 8 to output a control commend for adjusting each display frame of the plurality of intelligent display devices 21 of the display device assembly 2 in a timely fashion. Seeing that the embedded micro-processing module 7 of the present invention is able to dynamically and instantaneously control the video sources and the distribution mechanism of the video switch 6, and at the same time, dynamically controls the display data channels (DDCs)/Serial Communication Interface (SCI) 8 to output a control commend for adjusting each display frame of the plurality of intelligent display devices 21 of the display device assembly 2 in a timely fashion, therefore, a plurality of and/or all video contents are able to be displayed on the display device assembly, for example, a video wall.

Figure 14:
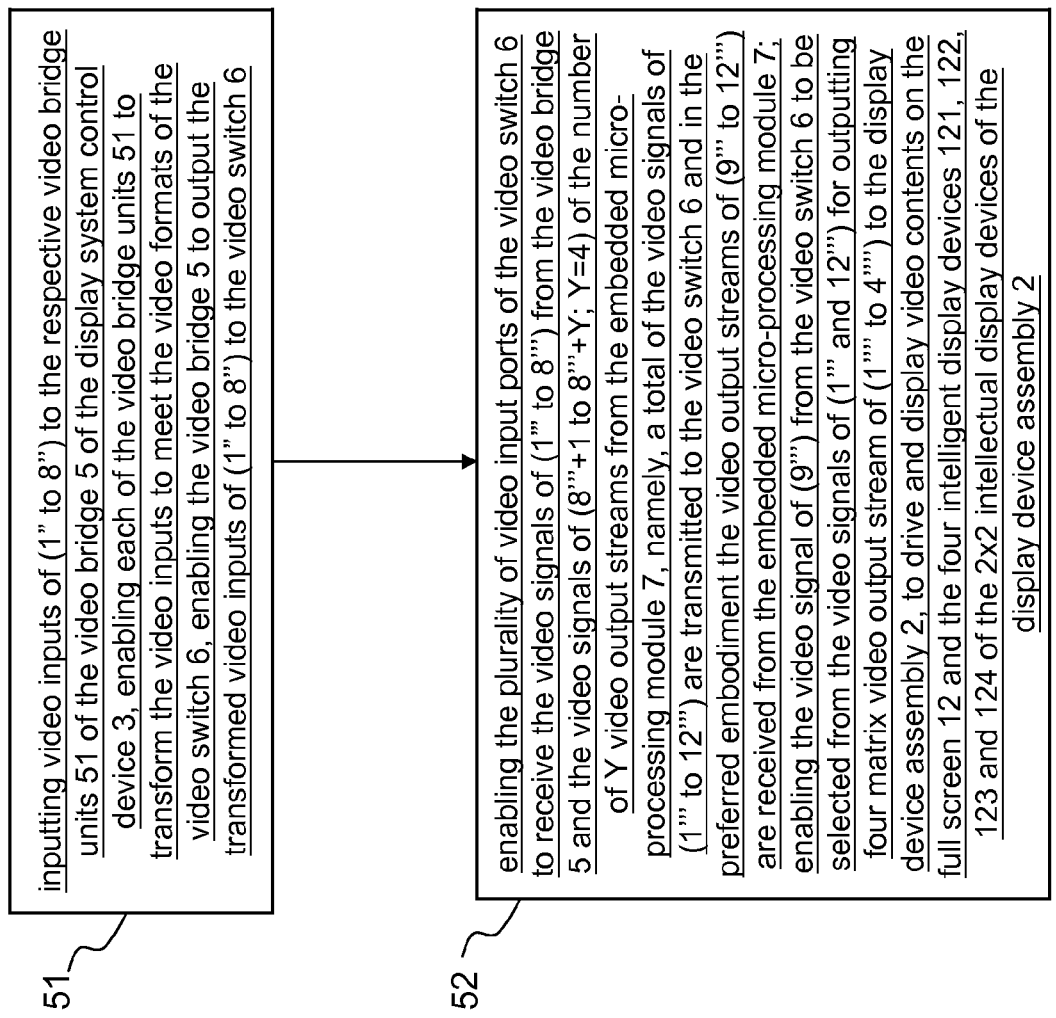
FIG. 14 illustrates a flow chart of a third preferred embodiment showing the video controlling method for controlling the video system of the present invention.

FIG. 14 illustrates a flow chart of a third preferred embodiment showing the video controlling method for controlling the video system of the present invention. FIG. 15 illustrates a schematic view showing the full screen of another display device assembly in a 2×2 matrix and a plurality of intellectual display devices according to the present invention. As shown in FIG. 15, the video control system 1 of the present invention is a 2×2 matrix display device assembly with four intellectual display devices 121, 122, 123, and 124 and a full screen 12. The method of another preferred embodiment includes the steps of (S51) inputting video inputs of (1″ to 8″) to the respective video bridge units 51 of the video bridge 5 of the display system control device 3, enabling each of the video bridge units 51 to transform the video inputs to meet the video formats of the video switch 6, enabling the video bridge 5 to output the transformed video inputs of (1″ to 8″) to the video switch 6. The plurality of video bridge units 51 of the display system control device 3 have the same video bridging functions as functions or their own specific video bridging functions. The method then goes to step (S52).

The step (S52) of the present invention includes enabling the plurality of video input ports of the video switch 6 to receive the video signals of (1‴ to 8‴) from the video bridge 5 and the video signals of (8‴+1 to 8‴+Y; Y=4) of the number of Y video output streams from the embedded micro-processing module 7, namely, a total of the video signals of (1‴ to 12‴) are transmitted to the video switch 6 and in the preferred embodiment the video output streams of (9‴ to 12‴) are received from the embedded micro-processing module 7; enabling the video signal of (9‴) from the video switch 6 to be selected from the video signals of (1‴ and 12‴) for outputting four matrix video output stream of (1⁗ to 4⁗) to the display device assembly 2, to drive and display video contents on the full screen 12 and the four intelligent display devices 121, 122, 123 and 124 of the 2×2 intellectual display devices of the display device assembly 2, wherein the video output streams of (1⁗ to 4⁗) are respectively and dynamically corresponding to any video signals of (1‴ to 8‴), although respective video output streams are all corresponding to the video signal of (9‴); besides, enabling the display data channels (DDCs)/serial communication interface (SCI) 8 to control the four matrix video output streams of (1⁗ to 4⁗) to be outputted from the video switch 6 with auxiliary display data channels of (1′⁗ to 4′⁗) to each of the plurality of intellectual display devices 21 of the display device assembly 2, or enabling a SCI signal to be serially connected to each of the plurality of intellectual display devices 21 of the display device assembly 2. In the preferred embodiment, the display data channel of (1′⁗) gives the command for controlling the upper left display screen of the intellectual display device 121, the display data channel of (2′⁗) gives the command for controlling the upper right display screen of the intellectual display device 122, the display data channel of (3′⁗) gives the command for controlling the lower left display screen of the intellectual display device 123 and the display data channel of (4′⁗) gives the command for controlling the lower right display screen of the intellectual display device 124; or the Serial Communication Interface transmits a control command of the display screens of the related intellectual display devices respectively through designated addresses.

The video controlling method of the present invention enables the embedded micro-processing module 7 to control the whole video control processing, and the video switch 6, the display data channels (DDCs)/Serial Communication Interface (SCI) 8 and the storage device 9 are controlled by a MPU control bus. Moreover, the embedded micro-processing module 7 receives information from a human interface and dynamically controls the video sources and the distribution mechanism from the video switch 6. In the preferred embodiment, the video output streams of (1"" to 4"") are selected from the video signal of (9") of the video switch 6 and transmitted to the display device assembly 2 with the full display screen 12 and the four intelligent display devices 121, 122, 123 and 124. The embedded micro-processing module 7 dynamically controls the display data channels (DDCs)/Serial Communication Interface (SCI) 8 to output a control commend for adjusting each display frame of the plurality of intelligent display devices 21 of the display device assembly 2 in a timely fashion. Seeing that the embedded micro-processing module 7 of the present invention is able to dynamically and instantaneously control the video sources and the distribution mechanism of the video switch 6, and at the same time, dynamically controls the display data channels (DDCs)/Serial Communication Interface (SCI) 8 to output a control commend for adjusting each display frame of the plurality of intelligent display devices 21 of the display device assembly 2 in a timely fashion, therefore, a plurality of and/or all video contents are able to be displayed on the display device assembly, for example, a video wall.

In view of the plurality of preferred embodiments above, the present invention provides a video control system, a display system control device and a video controlling method thereof. The present invention is applied to a display device assembly in a multimedia display circumstance. An embedded controlling video bridge of the display system control device of the video control system and the video switch of the present invention are applied to adjust the ways of providing video sources. In addition, the present invention applies a plurality of display data channels (DDCs) to respectively interlink or a serial communication interface (SCI) to serially connect to the screen display area, enabling a plurality of intelligent display devices to be selected and adjusted, matrix video contents from various sources to be respectively segmented and/or integrated to be presented on respective display devices of the display device assembly. The present invention is further applied to a video wall, which is made up of a plurality of matrix display screens for individual presentation.

In view of the foregoing, the video control system, the display system control device and the video control method of the present invention comprises the following advantages:
1. The present invention is applied to a display device assembly, such as a video wall, enabling more than one video inputs to be instantaneously processed.
2. The present invention employs a video bridge unit and distributed control processing method to enable various video contents from various sources to be segmented and displayed on respective matrix display devices of the display device assembly; namely, the present invention has improved the disadvantages of the prior art.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:
1. A video control applied to a display device assembly in a multimedia display circumstance comprising:
   a display system control device, controlling the processes of all signals in the video control system, outputting a plurality of video output streams, display data and serial communication interface signal, further comprising:
   at least one video bridge unit, receiving video inputs, and transforming the video inputs into video signals;
   an embedded micro-processing module;
   a video switch, receiving at least the video signals from the video bridge unit, and being coupled to the embedded micro-processing module, wherein the embedded micro-processing module is able to dynamically control a distribution mechanism of the video switch, and process the video signals received by the video switch, then the video switch outputs the video output streams;
   a display data channel/serial communication interface controller, being coupled to the embedded micro-processing module and the video switch, and being able to output the display data and a serial communication interface signal including addresses designated by the embedded micro-processing module;
   a storage device, storing various video or multimedia files for the embedded micro-processing module to read and transform the video signals received by the video switch and output by the video switch;
   a plurality of display data channels (DDCs), being coupled to the display system control device;
   a serial communication interface (SCI), being coupled to the display system control device; and
   a display device assembly, being coupled to the display data channels and serial communication interface of the display system control device and the video switch, also being composed of intellectual display devices having independent addresses, which are from 1A to M×N, where M and N are positive integers;
   wherein the intellectual display devices are able to receive the display data and the serial communication interface signal from the display data channels and the serial communication interface, receive the video output streams from the video switch, and then the display frame of the intellectual display devices are adjusted;
   wherein the video signals are generated to the format of the video output streams by the embedded micro-processing module, then outputted to the display data device assembly by the video switch;
   wherein the embedded micro-processing modulate is able to be operated, and dynamically distributes the display data and the serial communication interface signal to the corresponding intellectual display devices through the display data channels and the serial communication interface, thereby allowing the intellectual display devise to adjusted instantaneously;
   wherein the display data are transmitted to the intellectual display devices through the display data channels individually by the display data channel/serial communica- tion interface controller, and meanwhile, the serial communication interface signal is transmitted to the intellectual display devices.

2. The video control system according to claim 1, wherein the display device assembly is connected with the display control device by means of the plurality of video signal output streams and the plurality of display data channels (DDCs) or the single serial communication interface (SCI); wherein the number of the plurality of video output streams is equal to the number of intellectual display devices and the number of the display data channels (DDcs) is equal to the number of the intellectual display devices.

3. The video control system according to claim 1, wherein the video signals transformed by the video bridge unit can be read by the video switch.

4. The video control system according to claim 1, wherein each of the video bridge units has the same video bridging functions or specific video functions oneself.

5. The display system control device according to claim 1, wherein the display data channels (DDCs)/the serial communication interface (SCI) enable the matrix video output streams outputted from the video switch to attach displayed data or SCI signals.

* * * * *